H. O. EVANS.
CHUCK FOR MACHINE WORK.
APPLICATION FILED MAY 19, 1909.
971,979.
Patented Oct. 4, 1910.
2 SHEETS—SHEET 2.
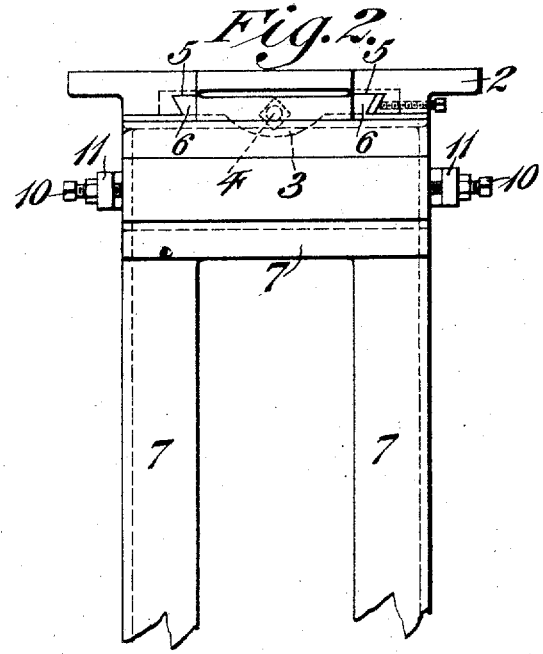
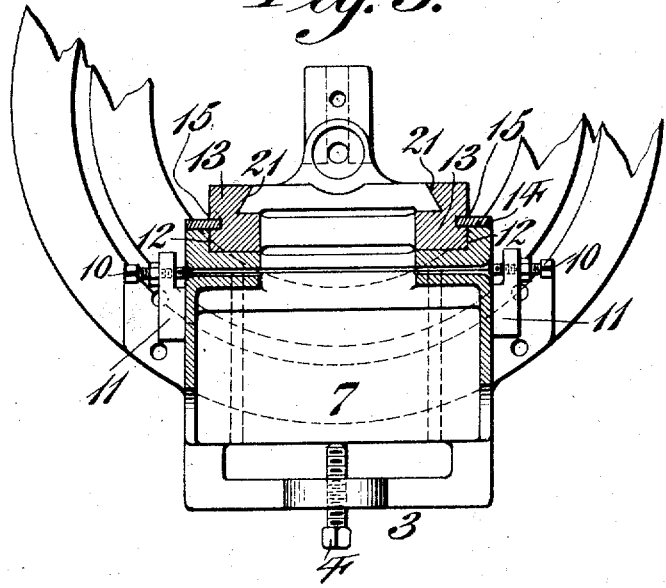
WITNESSES
L. Douville
P. F. Nagle
INVENTOR
Henry O. Evans
BY Wiedersheim & Fairbanks
ATTORNEYS

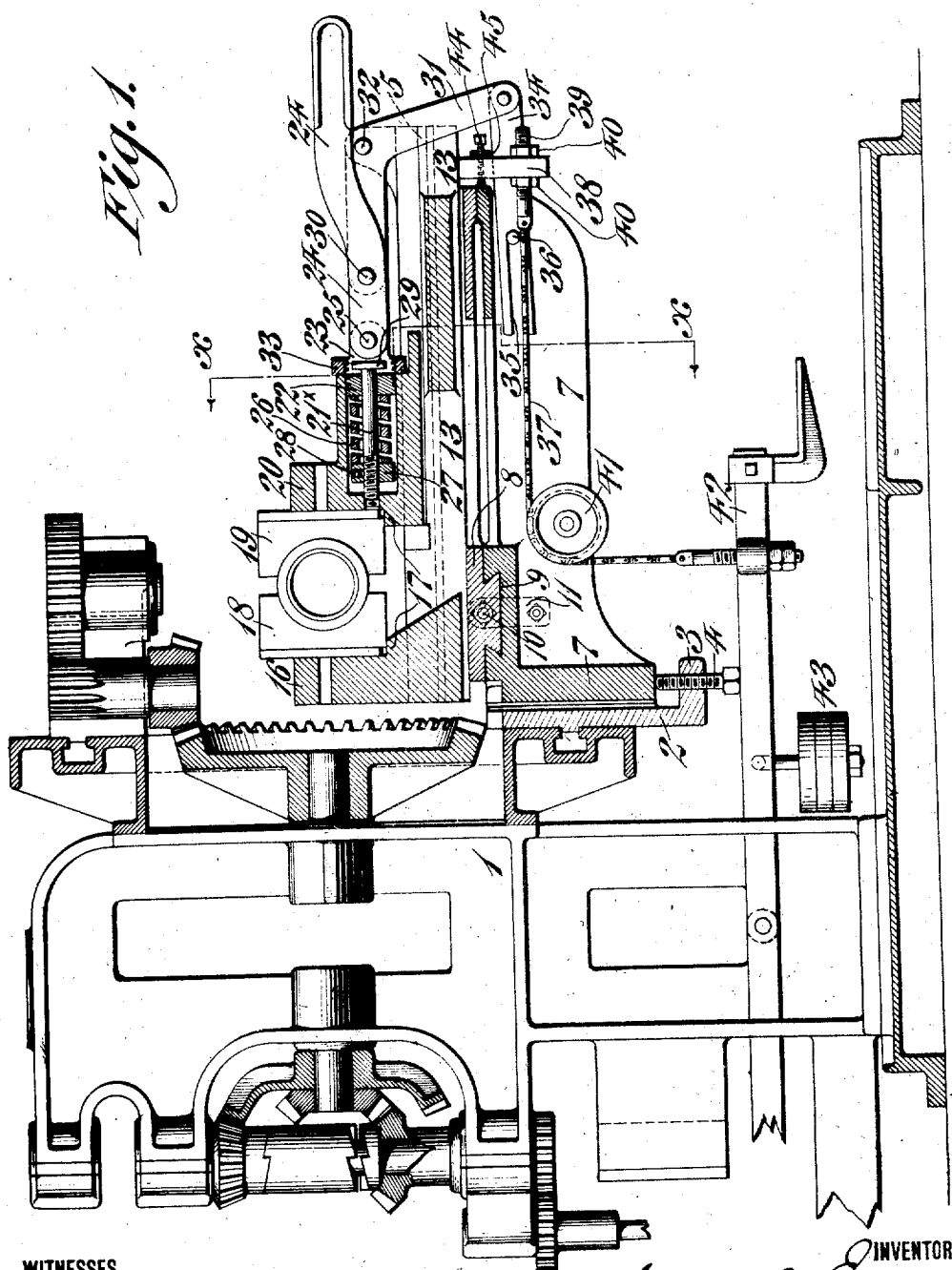

UNITED STATES PATENT OFFICE.

HENRY O. EVANS, OF DETROIT, MICHIGAN.

CHUCK FOR MACHINE-WORK.

971,979.　　　　Specification of Letters Patent.　　Patented Oct. 4, 1910.

Application filed May 19, 1909. Serial No. 497,038.

*To all whom it may concern:*

Be it known that I, HENRY O. EVANS, a citizen of the United States, residing in the city of Detroit, county of Wayne, State of Michigan, have invented a new and useful Chuck for Machine-Work, of which the following is a specification.

This invention relates to a chucking mechanism of the type designed to hold a part to be machined and more particularly such parts as are to be drilled, tapped or the like.

It has for an object to provide a chuck which will automatically and accurately center the part to be machined, one which is adjustable and whereby one and all fittings adapted to be used therein may be placed in the chuck without danger to the operator in case of premature starting of the machine.

It is well known in tapping or drilling of small articles that one operator generally takes care of a number of machines and passes rapidly from one to the other to remove the completed part or adjust the part to be operated upon.

In chucks as heretofore constructed the position of the same relative to the taps, drills or the like has been rigid or not capable of adjustment for centering the parts, on of such construction as to make it nearly impossible to insure safety to the operator in placing the parts in the chuck, while if the machine is stopped during the chucking operation the safety of the operator is protected, permitting him to chuck quickly and safely and to start the machine immediately on completion of chucking, thus saving valuable time.

In my present device I provide a chuck wherein the parts or fittings to be machined may be placed with absolute accuracy and safety to the operator, one which coöperates with the operating mechanism of the drilling or tapping machine, as the case may be, to actuate stopping mechanism, whereby the machine is brought to a standstill at the completion of a working movement and one in which the machine is started at the time a new part is placed in the chuck for a cutting operation. Furthermore, by my novel chuck an automatic adjustment of accurate center is made possible and whether the taps or drills are operating vertically or horizontally or both, the part being machined is accurately centered.

It further consists of other novel features of construction, all as will be hereinafter fully set forth.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a sectional side elevation of a chuck embodying my invention. Fig. 2 represents a plan of a portion of the same. Fig. 3 represents a section on line $x$—$x$ of Fig. 1.

Similar numerals of reference indicate corresponding parts in the figures.

Referring to the drawings:—1 designates, in the present instance, the main frame of a tapping machine, to which is fixedly secured in any desired manner a plate 2 provided with an outwardly projecting flange 3, through which latter an adjusting screw 4 is adapted to pass and coöperate with parts to be hereinafter described. This plate 2 is provided, in the present instance, with a dove-tailed slot 5 serving as a guide way for a projection 6 forming a part of a laterally extending bed 7, serving as a main support for my novel chuck mechanism. This chuck mechanism consists of a table 8 mounted for sliding movement upon the bed 7, which movement in the present instance is permitted by a suitable dove-tailed joint 9 between the two parts, adjustment of which is preferably controlled by suitable bolts 10 passing through lugs 11 secured to or forming a part of the bed 7. The table 8 is provided with a longitudinally formed groove 12, within which the carriage 13 of the chuck is adapted to fit, the same being maintained therein in normal operation by means of keys 14 secured to the table 8 and engaging ways 15 of the carriage 13. It will now be apparent that the carriage 13 may be adjusted longitudinally of the table 8 and thus permit movement of the chuck mechanism in one direction relative to the tapping mechanism, while the table 8 may be shifted transversely through the medium of the sliding connection 9 to vary the relation of the chuck in a transverse direction relative to the tapping mechanism and as the bed 7 may be moved in the plate 2 to shift the chuck in a vertical direction, it will be seen that all possible adjustments are accurately allowed.

The carriage 13 has preferably formed on one end an upwardly extending face 16 provided with a suitable shoulder 17 in order that one jaw 18 of the chuck may be properly positioned therein, the same jaw being secured in any well known manner therein. The opposite jaw 19 of the chuck is similarly mounted in a head 20 which is suitably secured upon the carriage 13, preferably through the medium of a dove-tailed joint 21, seen in Fig. 3. In order to operate the head 20 relative to the face 16 I provide, in the present instance, a bolt $21^x$ screw threaded into the member 20, the said bolt passing through a threaded bushing 22 having ears 23 thereon suitably spaced apart to receive a hand lever 24, which is secured thereto by a pivot 25. Encircling the bolt $21^x$ is a spiral spring 26 normally held in place by a block 27, in the present instance adjustably secured upon the bolt $21^x$ by means of a set screw 28 and so positioned relative to the member 20 as to allow sufficient clearance space for proper operation of the parts. It will likewise be necessary to properly adjust the parts for a clearance space between the bolt head 29 and the bushing member 22 in order to allow the jaw 20 movement sufficient to hold securely and automatically parts of varying size, other chucks requiring manual adjustment. The hand lever 24 has secured thereto by means of a pivot 30, one end of a bell crank 31, which latter is mounted upon the carriage 13 by means of a pivot 32, whereby it will be clear that when the parts are in the position seen in Fig. 1, with the jaw 19 engaging a tee, ell or the like, the spring 26 will be under tension sufficient to cause a quick and instant release of the parts when the lever 24 is raised.

Attention is directed to a collar 33 which is threaded upon the bushing 22 and acts as a stop to adjust the opening of the chuck at any predetermined distance, so that any tendency of a part to turn and open the jaws is overcome. One end of the bell crank 31 has pivoted thereto an arm 34 provided with an open-ended slot 35 adapted to engage a pin 36, which is secured to the frame 7. It will be seen that when the arm 34 is shifted so that the pin 36 is engaged by the end of the slot 35, a leverage is produced which operates to shift the carriage 13 and thereby bring the entire chuck mechanism out of the line of the tapping mechanism. In order to return the carriage 15 to normal position I disclose, in the present instance, a chain 37 or equivalent device secured to a lug 38 of the carriage 13 by an adjustable connection, consisting of a bolt 39 and lock nuts 40. The chain 37 is here shown as passing over a guide pulley 41 and is secured to a treadle lever 42, which latter carries a counterweight 43 for ease of operation and correct balancing of the different parts.

44 designates a bolt suitably threaded into the lug 38 and in alinement with the bed 7, the purpose of which is to act as a stop for the carriage 13 to limit the movement of the chuck mechanism and properly position the same relative to the tapping or drilling mechanism. It will of course be understood that suitable lock nuts 45 are mounted thereon to maintain the same in adjusted position and it is preferable to adjust this bolt 44 so that there is a slight clearance which permits the chuck to go a little farther back, if necessary, and thus allow a floating action so that the taps may strike the fitting and automatically adjust it for the machine operation.

In operation, assuming the parts to be as shown in Fig. 1, if it is desired to remove the tee, ell or like part being tapped or drilled, as the case may be, the operator raises the hand lever 24, thereby shifting the member 20 and jaw 19 to permit the said part to drop out. During this operation the bell crank member 31 has been shifted to engage the pin 36 and a continued upward movement of the hand lever 24 produces a movement of the carriage 13 in the ways of the frame 7, thus removing the entire chuck from the path of movement of the tapping or drilling mechanism. When the parts have reached this position, which they do almost immediately, the operation just described being a continuous one, a new tee, ell or part is placed between the jaws 19 and 20 and the operator returns the hand lever 24 to original position and depresses the foot treadle 42, whereupon the carriage 13 and the parts carried thereby are shifted directly into correct position and alinement with the taps and drills, which position, as determined by the adjustment stop, and the machine starts. In this manner one machine after another is taken care of by a single operation, the stopping and starting occupying but a minimum of time and the danger of injury from removing a part while the machine is in operation is entirely eliminated.

Particular attention is directed to the many adjustments for accurate tapping, since the free floating movement of the chuck permits a three-way movement for bringing the fitting into alinement and center of the operating mechanism, which results in an accurate controlling or tapping of the hole, as the case may be.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a table, a carriage slidingly mounted thereon provided with a jaw member, a second jaw mounted on said carriage for movement relative thereto, a spring operatively secured to said second jaw, a lever pivotally mounted on said carriage, and connecting means between the said spring and lever, whereby the lever opens said jaw when moved in one direction and releases said jaw to the action of the spring when moved in the opposite direction.

2. In a device of the character stated, a carriage, a jaw carried thereby, a second jaw slidingly mounted adjacent thereto, a lever pivoted to said carriage, a bushing connected to said lever, a member secured to said second jaw and having sliding engagement with said bushing, means on said member to impart movement of said lever in one direction to said second jaw, and yielding means between said lever and said member.

3. In a device of the character stated, a carriage, a jaw carried thereby, a second jaw slidingly counted adjacent thereto, a lever pivoted to said carriage, a bushing connected to said lever, a member secured to said second jaw and having sliding engagement with said bushing, means on said member to impart movement of said lever in one direction to said second jaw, a spring between said lever and said member, and means to adjust the tension of said spring.

HENRY O. EVANS.

Witnesses:
EDWIN WALTZ,
A. L. SHAMBLEAU.